Patented Aug. 24, 1948

2,447,593

UNITED STATES PATENT OFFICE 2,447,593

PRODUCTION OF PRIMARY ALKYL HALIDES

John C. Munday, Cranford, N. J., assignor to Standard Oil Development Company, a corporation of Delaware No Drawing. Application May 10, 1943, Serial No. 486,419

9 Claims. (Cl. 260—653)

The present invention relates to primary alkyl halides and processes for producing the same, and more particularly it relates to branched chain primary alkyl chlorides.

It has been known that the preparation of primary halo derivatives of acylic hydrocarbons is difficult. The preparation of the secondary and tertiary alkyl halides is relatively easily achievable. Thus when a paraffin is treated at high temperatures with a halogen such as chlorine, the chlorine substitutes with greater facility, the hydrogen attached to a carbon atom which is connected to at least two other carbon atoms, than when said hydrogen is attached to a terminal carbon atom. When isoparaffins are subjected to direct halogenation, the product obtained is mostly secondary and tertiary halides. Furthermore, when olefins are hydrohalogenated, the reaction normally follows Markownikoff's Rule that the halogen adds to the unsaturated carbon atom bearing the least hydrogen atoms with the result that secondary and tertiary halides are produced, rather than the primary halides.

I have now discovered a method for producing primary halides, which involves the alkylation of isoparaffins or other compounds containing a tertiary hydrogen with a halogenated derivative of an olefin. By means of this process a number of new compounds have been prepared, for example, 2-methyl 3-chlormethyl pentane by the alkylation of isobutane with allyl chloride.

Important features of my invention are the use of low temperatures, and of alkylation catalysts which are highly active at the low temperatures, thus avoiding polymerization, cracking, dehydrohalogenation and isomerization of the primary halide product to secondary and tertiary halides. Suitable catalysts are chlorsulfonic acid, fluorsulfonic acid and hydrofluoric acid. The temperature should preferably be below 0° C.; good results have been obtained as low as —70° C. The preferred range is from —40° to —50° C., however, using chlorsulfonic acid as a catalyst.

It is also important to use a halogenated olefinic feed stock containing the halogen in a primary position, if primary halides are to be obtained. Further, the halogen is substituted in a methyl group rather than in the olefinic CH$_2$= group. The specific isoparaffins and olefin derivatives employed, of course, depend on the specific products desired. Suitable reactants containing a tertiary hydrogen are isobutane, isopentane, isohexane and methyl cyclohexane, etc., while suitable halogenated olefinic reactants are allyl chloride, methallyl chloride, the halogen derivatives of n-butene and iso- and normal-pentene, etc.

The probable formula of preferred compounds made according to this invention, is as follows:

$$\begin{array}{c} \text{CH}_3 \ \ \text{CH}_2\text{X} \\ | \ \ \ \ \ | \\ \text{CH}_3\text{—C——C—CH}_2\text{—CH}_3 \\ | \ \ \ \ \ | \\ \text{H} \ \ \ \text{H} \end{array}$$

where X is a halogen atom.

Without limiting myself to the precise details and with the understanding that they are offered merely by way of illustration, I set forth below two specific examples fully disclosing preferred modifications of my invention.

Example 1

2-methyl 3-chlormethyl pentane was prepared as follows: 3 mols of isobutane were mixed with about 62.5 weight percent of chlorsulfonic acid catalyst (based on the isobutane) and the mixture was cooled to about —45° C. One mol of allyl chloride was slowly added during a period of one hour while constantly stirring the mixture. The stirring was continued for two hours after all of the allyl chloride had been added. The mixture was permitted to stratify into a lower catalyst layer and an upper oily layer. The upper layer was separated by decantation and subjected first, to distillation to remove the excess isobutane and then to a further distillation. In the second distillation, a large portion (as much as 75%) of the product boiled at 147° C. which indicated selective alkylation. The 147° C. fraction had a bromine number of 0.4 and a specific gravity of 0.8895

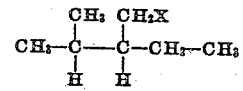

and contained 26.45% chlorine. The calculated chlorine content of C$_7$H$_{15}$Cl is 26.35%. The probable formula of the heptyl chloride is $$\begin{array}{c} \text{CH}_3 \ \ \text{CH}_2\text{Cl} \\ | \ \ \ \ \ | \\ \text{CH}_3\text{—CH—CH—CH}_2\text{—CH}_3 \end{array}$$

as shown by the following tests:

First, the above compound was not converted to an alcohol by refluxing for five hours with aqueous KOH. It was not converted to an alcohol by treatment with moist silver oxide. It was not converted to an olefin by refluxing for 3.5 hours with butyl alcoholic KOH. It was not converted to a paraffin by reduction with zinc and hydrochloric acid. The above negative tests indicate strongly that the chlorine is attached to a primary carbon because if it were attached to a secondary or tertiary carbon atom it would certainly have responded to the above tests. The aqueous KOH had no effect whatever, while the alcoholic KOH converted the compound to an ether. In order to determine the carbon structure of the compound, it was converted to a paraffin by reacting with magnesium in ether solution and hydrolyzing the resulting Grignard reagent with dilute HCl at 0° C. The paraffin was identified as 2,3-dimethyl pentane by means of its boiling point (89.7° C.) and specific gravity. The heptyl chloride was also converted to an alcohol by means of the Grignard reaction, by oxidizing the Grignard reagent with dry oxygen prior to hydrolyzing with dilute HCl. The alcohol boiled at from 165–166.5° C. at 1 atmosphere pressure, and at 71–72° C. at 17 mm. and had a specific gravity of 0.836. The alcohol was oxidized by means of chromium oxide to an acid boiling between 203 and 210° C., which was converted to the acid chloride and then to the amide which melted at 135° C. This smelting point corresponds with the value given for the melting point given in the literature (Jour. Chem. Soc. 77, 91) for ethyl isopropyl acetamide:

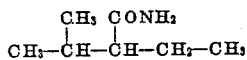

indicating that the heptyl chloride prepared by the alkylation of isobutane with allyl chloride is 2-methyl 3-chlormethyl pentane.

*Example 2*

Isobutane was reacted with methallyl chloride in the presence of chlorsulfonic acid catalyst under the same conditions and employing the same quantities (i. e., 3 mols isobutane to 1 mol of methallyl chloride) as those employed in Example 1. The methallyl chloride was added while stirring the mixture during a period of one hour and the mixture was stirred for two hours after all of the methallyl chloride had been added. The amount of catalyst was the same as in Example 1 and the temperature was maintained at about −45° C. The main products were isobutyl chloride, dichlor isobutane and a branched chain octyl chloride. The boiling point of the octyl chloride was about 157° C., which differentiates it from any previously reported octyl chloride. While the exact structure of the octyl chloride has not yet been determined, it is indicated that the chlorine is attached to a primary carbon of a branched structure.

The principle of my invention may be applied to the production of a large plurality of primary halogenated alkyl compounds by means analogous to those disclosed above. The foregoing specific examples are merely illustrative and do not impose any limitation on my invention, and obviously any desired halide may be made by alkylation of the proper halogenated olefin with an isoparaffin.

The amount of halogenated sulfonic acid (which acid may be chlorsulfonic acid, fluorsulfonic acid, etc.) used in my process may vary from ¼ to 2 parts by weight of acid per part of isoparaffin. Further, the ratio of isoparaffin to halogenated olefin in the reaction mass may vary from 1 to 100 mols of isoparaffin per mol of the olefin, but the isoparaffin is preferably employed in molecular excess over the said olefin.

My present invention provides means for the production of high boiling alykyl chlorides, fluorides and bromides wherein the halogen is attached to a primary carbon atom, which halides are highly stable against hydrolysis, dehalogenation, isomerization and reduction. The products find especial use as high boiling solvents, and as intermediates in the production of branched chain alcohols, ethers of high octane number and esters, and of many useful compounds not otherwise obtainable except by expensive laboratory methods such as the Grignard reaction.

Numerous modifications of my invention may be made by those familiar with the art without departing from the spirit thereof.

What I claim is:

1. Method of producing primary halogenated hydrocarbons, which comprises reacting an olefin, halogenated in a primary position, with an isoparaffin in the presence of a catalyst consisting of halosulfonic acid under alkylation conditions, at a temperature between about 0° C. and about −70° C.

2. Method according to claim 1, in which a chlorsulfonic acid is used as the catalyst.

3. Method according to claim 1, in which a chlorsulfonic acid is used as the catalyst and the temperature is between about −40 and about −70° C.

4. Method according to claim 1 in which the reaction is carried out at a temperature between about −40° C. and about −70° C.

5. Method according to claim 1 in which the isoparaffin is present in molecular excess with respect to the halogenated olefin in the reaction mass.

6. A process which comprises reacting isobutane with allyl chloride in the presence of a catalyst consisting of halosulfonic acid at a temperature between about 0° C. and about −70° C.

7. A process according to claim 6 in which the temperature of the reaction is maintained at about −45° C. and in which the catalyst is chlorosulfonic acid.

8. A process which comprises reacting isobutane with methallyl chloride in the presence of a catalyst consisting of halosulfonic acid at a temperature between about 0° C. and about −70° C.

9. A process according to claim 8 in which the temperature is maintained at about −45° C. and in which the catalyst is chlorosulfonic acid.

JOHN C. MUNDAY.

REFERENCES CITED

The following references are of record in the file of this patent:

UNITED STATES PATENTS

| Number | Name | Date |
| --- | --- | --- |
| 2,068,772 | Sixt | Jan. 26, 1937 |
| 2,286,504 | Parker | June 16, 1942 |
| 2,297,564 | Kirkbride | Sept. 29, 1942 |
| 2,353,766 | Schmerling | July 18, 1944 |

FOREIGN PATENTS

| Number | Country | Date |
| --- | --- | --- |
| 695,125 | France | Dec. 11, 1930 |
| 824,909 | France | Feb. 18, 1938 |
| 261,689 | Germany | July 2, 1913 |

OTHER REFERENCES

Simons, "Industrial and Engineering Chemistry," vol. 32, page 182 (1940).

"Chem. Abstracts," vol. 27, pages 4770-1 (1933), abst. of article by Soday et al. in "J. Am. Chem. Soc.," vol. 55, pages 3293-302 (1933).

Ibid., vol. 26, page 426, (1932), abstract of ar- (Other references on following page)

OTHER REFERENCES ticle by Braun et al. in "Ann," vol. 490, pages 179-88 (1931).

Ibid., vol 26, page 1246 (1932), abst of article by Braun et al. in "Ber.," vol. 64B, pages 2617-21 (1931).

Ibid., vol 25, page 4845 (1931), abstract of article by Levene et al. in "J. Biol. Chem.," vol. 91, pages 405-18 (1931).

Ibid., vol. 30, col. 79-80 (1936), abstract of article by Levene et al. in "J. Biol. Chem.," vol. 111, pages 299-312 (1935).

Ibid., vol. 33, col. 972 (1939), abstract of article by Houston et al. in "J. Org. Chem.," vol 3, pages 251-60 (1938).

Beilstein, "Handbuch der Organischen Chemie," vol. 1, pages 157-8.